United States Patent
Artyomov et al.

(10) Patent No.: US 9,392,236 B2
(45) Date of Patent: Jul. 12, 2016

(54) IMAGE PROCESSING METHOD, IMAGE SIGNAL PROCESSOR, AND IMAGE PROCESSING SYSTEM INCLUDING THE SAME

(71) Applicant: SAMSUNG ELECTRONICS CO., LTD., Suwon-si, Gyeonggi-do (KR)

(72) Inventors: Evgeny Artyomov, Rehovot (IL); Roee Sfaradi, Nes Ziona (IL); Ju Young Lee, Seoul (KR); Artem Zinevich, Tel Aviv (IL); German Voronov, Holon (IL); Eugene Fainstain, Netanya (IL)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 14 days.

(21) Appl. No.: 14/067,220

(22) Filed: Oct. 30, 2013

(65) Prior Publication Data
US 2014/0118582 A1 May 1, 2014

(30) Foreign Application Priority Data
Oct. 31, 2012 (KR) .................. 10-2012-0122501

(51) Int. Cl.
| H04N 9/04 | (2006.01) |
| G06T 3/40 | (2006.01) |
| H04N 5/217 | (2011.01) |
| H04N 9/73 | (2006.01) |
| H04N 5/262 | (2006.01) |

(52) U.S. Cl.
CPC .............. *H04N 9/045* (2013.01); *G06T 3/4015* (2013.01); *H04N 5/217* (2013.01); *H04N 5/2628* (2013.01)

(58) Field of Classification Search
USPC ......................................... 348/242
See application file for complete search history.

(56) References Cited

U.S. PATENT DOCUMENTS

| 4,642,678 A | 2/1987 | Cok |
| 4,724,395 A | 2/1988 | Freeman |
| 5,189,511 A * | 2/1993 | Parulski et al. ............... 358/518 |
| 7,671,910 B2 | 3/2010 | Lee |
| 7,916,207 B2 | 3/2011 | Moon et al. |

(Continued)

FOREIGN PATENT DOCUMENTS

| JP | 2009147762 | 7/2009 |
| KR | 1020070003420 | 1/2007 |
| KR | 1020100077314 | 7/2010 |

OTHER PUBLICATIONS

Jim Adams et al., "Color Processing in Digital Cameras", IEEE 1998, pp. 20-29.

(Continued)

*Primary Examiner* — Roberto Velez
*Assistant Examiner* — Stephen Coleman
(74) *Attorney, Agent, or Firm* — F. Chau & Associates, LLC

(57) ABSTRACT

An image processing method includes: receiving image data of a Bayer format comprising red color information, green color information, and blue color information, generating image data of a modified Bayer format by combining the green color information with the red color information and combining the green color information with the blue color information while downscaling the image data of the Bayer format to a target resolution, denoising the image data of the modified Bayer format, and generating RGB image data by demosaicing the denoised image data of the modified Bayer format.

15 Claims, 14 Drawing Sheets

(56) References Cited

U.S. PATENT DOCUMENTS

| | | |
|---|---|---|
| 8,009,935 B2 | 8/2011 | Sakamoto |
| 8,041,110 B2 | 10/2011 | Hasegawa |
| 8,077,234 B2 | 12/2011 | Takemura et al. |
| 2004/0051799 A1 | 3/2004 | Yamanaka |
| 2005/0134734 A1* | 6/2005 | Adams et al. ............... 348/518 |
| 2005/0285968 A1* | 12/2005 | Sugimori .................... 348/345 |
| 2008/0260291 A1* | 10/2008 | Alakarhu et al. ............ 382/298 |
| 2009/0034878 A1* | 2/2009 | Sakamoto .................... 382/300 |
| 2010/0086202 A1 | 4/2010 | Omata et al. |
| 2011/0063480 A1* | 3/2011 | Kim ............................ 348/242 |

OTHER PUBLICATIONS

Jim Adams et al., "Color Processing in Digital Cameras", 1998 IEEE, pp. 20-29.

* cited by examiner

FIG. 3

| G | R | G | R |
|---|---|---|---|
| B | G | B | G |
| G | R | G | R |
| B | G | B | G |

Bayer

| G | G$^+$R | G | G$^+$R |
|---|---|---|---|
| G$^+$B | G | G$^+$B | G |
| G | G$^+$R | G | G$^+$R |
| G$^+$B | G | G$^+$B | G |

BayerPlus

| RGB | RGB | RGB | RGB |
|---|---|---|---|
| RGB | RGB | RGB | RGB |
| RGB | RGB | RGB | RGB |
| RGB | RGB | RGB | RGB |

RGB

FIG. 4

| Format | Bits/Pixel |
|---|---|
| Bayer | N |
| RGB | 3N |
| BayerPlus | 1.5N |

IMAGE PROCESSING METHOD, IMAGE SIGNAL PROCESSOR, AND IMAGE PROCESSING SYSTEM INCLUDING THE SAME

CROSS-REFERENCE TO RELATED APPLICATIONS

This application claims priority under 35 U.S.C. §119(a) to Korean Patent Application No. 10-2012-0122501 filed on Oct. 31, 2012, the disclosure of which is incorporated by reference in its entirety herein.

BACKGROUND

1. Technical Field

Exemplary embodiments of the inventive concept relate to a method of processing raw image data sensed by an image sensor into output image data, an image signal processor to execute the method, and an image processing system including the image signal processor.

2. Discussion of Related Art

An image sensor includes pixels that convert an electrical signal corresponding to the brightness of incident light into a digital signal. The image sensor may be formed in a Bayer pattern and provide Bayer image data corresponding to the brightness of light incident on the Bayer pattern.

The Bayer image data provided from the image sensor may be subjected to signal processing, such as color interpolation, brightness adjustment, color adjustment, and image format conversion. A result of the signal processing may have noise. While techniques can be used to remove the noise from the image data, these techniques may use an excessive amount of power or degrade image quality.

SUMMARY

According to an exemplary embodiment of the inventive concept, an image processing method includes receiving Bayer raw image data including red color information, green color information, and blue color information from an image sensor; downscaling the Bayer raw image data to a target resolution while keeping the green color information separately; generating BayerPlus image data by combining the green color information with the red color information and combining the green color information with the blue color information; denoising the BayerPlus image data; and generating RGB image data by demosaicing the denoised BayerPlus image data.

According to an exemplary embodiment of the inventive concept, an image signal processor includes a downscaler block configured to receive Bayer image data from an image sensor, to downscale the Bayer image data to a target resolution, and to convert the Bayer image data into a BayerPlus image data; a denoising block configured to denoise the BayerPlus image data; and a demosaicing block configured to convert the denoised BayerPlus image data into an RGB image data.

According to an exemplary embodiment of the invention, an image processing method includes: receiving image data of a Bayer format comprising red, green, and blue color information; generating image data of a modified Bayer format by combining the green color information with the red color information and combining the green color information with the blue color information while downscaling the image data of the Bayer format to a target resolution; denoising the image data of the modified Bayer format; and generating RGB data by demosaicing the denoised image data of the modified Bayer format.

According to an exemplary embodiment of the invention, an image processing method includes: receiving first image data comprising original pixels, where each original pixel comprises only one of red, green, and blue color information, and the green information is twice the red or blue; generating a first new pixel including the green information of a first one of the original pixels and the red information of a second one of the original pixels; generating a second new pixel comprising the green information of a third one of the original pixels and the blue information of a fourth one of the original pixels; generating second image data from the first image data, where the second image data has a lower resolution than the first image data and includes the first and second new pixels, and a third new pixel including only the green information of a fifth one of the original pixels; denoising the second image data to generate denoised second image data; and demosaicing the denoised second image data to generate image data whose pixels each include red, green, and blue information.

BRIEF DESCRIPTION OF THE DRAWINGS

The inventive concept will become more apparent by describing in detail exemplary embodiments thereof with reference to the attached drawings in which:

FIG. 3 is a conceptual diagram for the comparison among a BayerPlus format according to an exemplary embodiment of the inventive concept, a Bayer format, and an RGB format;

FIG. 4 is a table showing the comparison among the Bayer format, RGB format, and the BayerPlus format on the basis of the number of bits per pixel;

DETAILED DESCRIPTION

Figure 1:
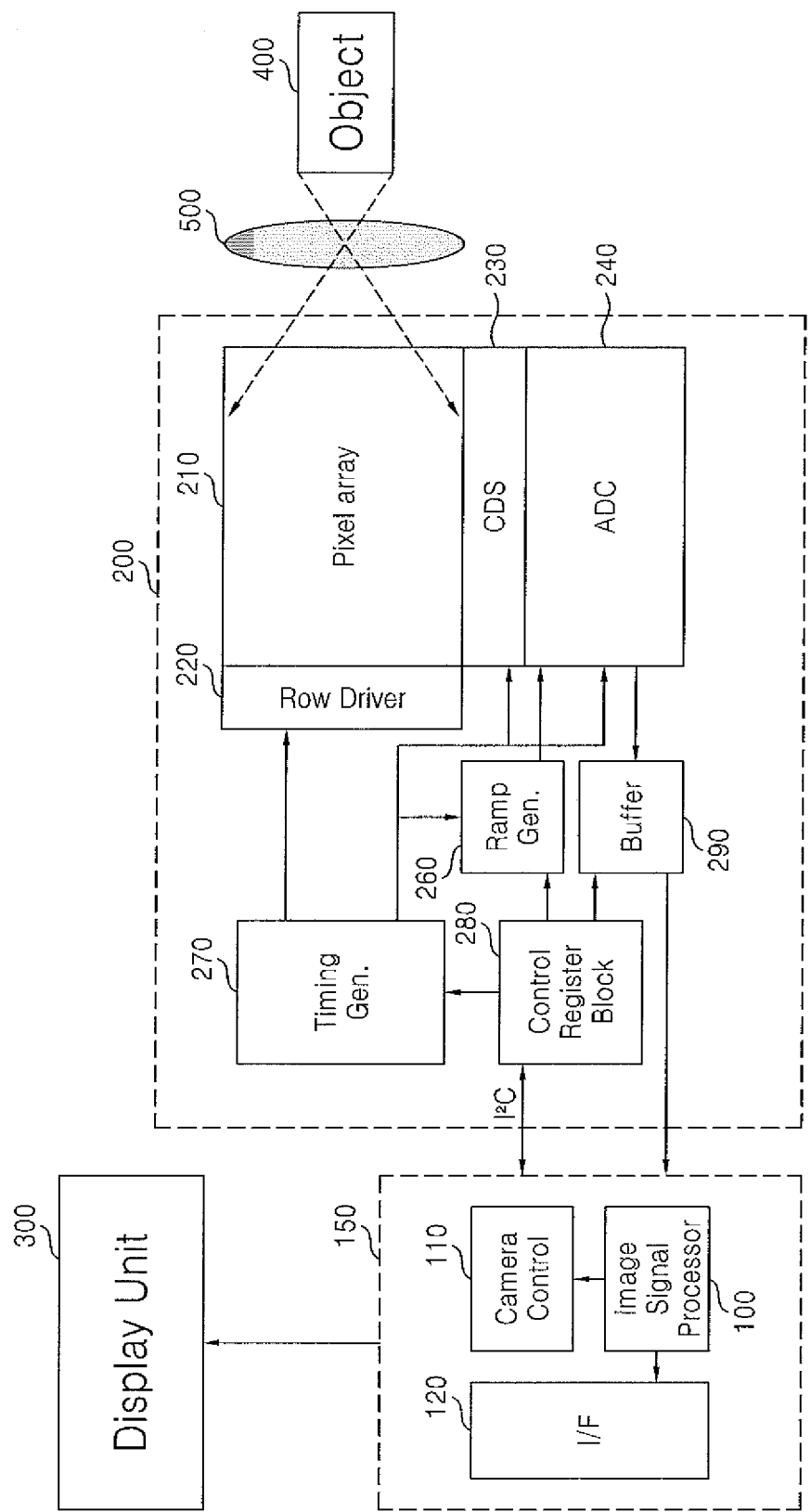
FIG. 1 is a block diagram of an image processing system including an image signal processor (ISP) according to an exemplary embodiment of the inventive concept.

The inventive concept now will be described more fully hereinafter with reference to the accompanying drawings, in which exemplary embodiments of the invention are shown. This invention may, however, be embodied in many different forms and should not be construed as limited to the exemplary embodiments set forth herein. In the drawings, the size and relative sizes of layers and regions may be exaggerated for clarity. Like numbers refer to like elements throughout. It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

Image sensors according to an embodiment of the inventive concept include either a charge coupled device (CCD) or a complementary metal oxide semiconductor (CMOS) image sensor. Image sensors using CCD processes (hereinafter, referred to as CCD image sensors) have less noise and higher quality pictures than image sensors using CMOS processes (hereinafter, referred to as CMOS image sensors). However, the CCD image sensors require a high voltage and can be expensive to manufacture. The CMOS image sensors may be simpler to operate than the CCD image sensors and can be realized in various scanning modes. In addition, since signal processing circuits can be integrated into a single chip, products using a CMOS image sensor can be smaller. When CMOS image sensors are used, manufacturing cost may be reduced. Further, since CMOS image sensors have very low power consumption, they may be incorporated into products having limited battery capacity. Accordingly, hereinafter, an image sensor is described as being a CMOS image sensor in at least one embodiment of the inventive concept. However, the inventive concept also applies to CCD image sensors.

FIG. 1 is a block diagram of an image processing system including an image signal processor (ISP) 100 according to an exemplary embodiment of the inventive concept. Referring to FIG. 1, an image sensor 200 includes a pixel array 210, a row driver 220, a correlated double sampling (CDS) block 230, an analog-to-digital converter (ADC) 240, a ramp generator 260, a timing generator 270, a control register block 280, and a buffer 290.

The image sensor 200 may sense an object 400 picked up through a lens 500 according to the control of a digital signal processor (DSP) 150. The DSP 150 may output an image to a display unit, which has been sensed and output by the image sensor 200. The display unit 300 may be any device that can output or display images. For instance, the display unit 300 may be a computer, a mobile communication device, or any type of image output terminal. The display unit 300 may include various display panels, such as a liquid crystal display, a plasma display, etc.

The DSP 150 includes a camera control 110, the ISP 100, and an interface (I/F) 120. The camera control 110 controls the operation of the control register block 280. The camera control 110 may control the image sensor 200. In an exemplary embodiment, the camera control 110 controls the control register block 280 using an inter-integrated circuit (I²C), but the inventive concept is not restricted thereto. I²C is a multi-master serial single-ended computer bus protocol for attaching low speed peripherals to a motherboard, embedded signal, smartphone, or other electronic device.

The ISP 100 receives image data output from the buffer 290, processes the image data and outputs the processed image data to the display unit 300 through the I/F 120. The processing of the image data by the ISP 100 may include performing image enhancement, error correction, noise reduction, etc. on the image data. While the ISP 100 is illustrated in FIG. 1 as being disposed within the DSP 150, in an exemplary embodiment, the ISP is disposed within the image sensor 200. The image sensor 200 and the ISP 100 may be implemented together in a single package, e.g., a multi-chip package.

The pixel array 210 includes a plurality of photo sensitive devices such as photo diodes or pinned photo diodes. In an exemplary embodiment, a pinned diode is a diode with a wide lightly doped "near" intrinsic semiconductor region between a p-type semiconductor region and an n-type semiconductor region. Raw image data output from the pixel array 210 via the CDS block 230 and the ADC 240 may be Bayer image data in a normal Bayer format. In the normal Bayer format, a block of the Bayer image data includes red color information, blue color information, and first and second green color information. For example, the block of the Bayer image data includes twice as much green color information as blue color information or green color information. The Bayer image data is converted into an RGB (red, green, blue) format in the ISP 100 and the RGB formatted data is output to the display unit 300.

Figure 2:
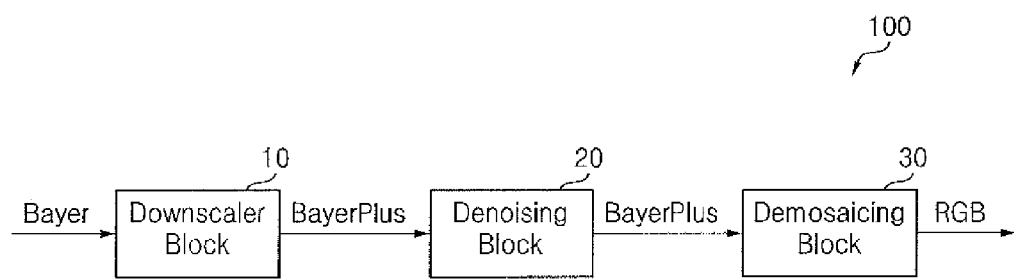
FIG. 2 is a block diagram of the ISP illustrated in FIG. 1 according to an exemplary embodiment of the inventive concept.

FIG. 2 is a block diagram of the ISP 100 illustrated in FIG. 1 according to an exemplary embodiment of the inventive concept. Referring to FIG. 2, the ISP 100 includes a downscaler block 10, a denoising block 20, and a demosaicing block 30.

The downscaler block 10 receives Bayer image data from the buffer 290 and downscales the raw resolution of the Bayer image data to a target resolution. In an exemplary embodiment, the downscaling reduces the raw resolution to a lower target resolution. The downscaler block 10 converts the Bayer image data into data in a BayerPlus format during the downscaling. The downscaling will be described below in detail with reference to FIGS. 3 and 4. For example, the BayerPlus format is modified version of the Bayer format according to an exemplary embodiment of the inventive concept with denser green color information than the Bayer format.

The denoising block 20 denoises image data in the BayerPlus format. For example, the denoising block 20 removes noise from the image data in the BayerPlus format. The removing of noise will be described below in detail with reference to FIG. 5.

The demosaicing block 30 converts the denoised image data in the BayerPlus format into image data in the RGB format. The conversion by the demosaicing block 30 will be described in detail below with reference to FIGS. 8 through 11.

FIG. 3 is a conceptual diagram for the comparison among the BayerPlus format according to an exemplary embodiment of the inventive concept, the Bayer format, and the RGB format. FIG. 4 is a table showing the comparison among Bayer format, the RGB format, and the BayerPlus format on the basis of the number of bits per pixel.

Referring to FIG. 3, each pixel N in the Bayer image data includes red, green or blue color information (Bayer, 1N). The BayerPlus image data has green color information in red and blue channels (BayerPlus, 1.5N), thereby having denser green color information in each pixel in the same color information disposition as the Bayer image data. The RGB image data includes all of red, green and blue color information in each pixel N (RGB, 3N).

When the BayerPlus image data is compared with raw Bayer image data having N bits per pixel with reference to FIG. 4, green color information is added to both a red channel and a blue channel, so that the BayerPlus image data has an average of 1.5N bits per pixel. The RGB image data includes all of three channel (red, green, and blue) color information in each pixel and thus has 3N bits per pixel. In an exemplary embodiment of the inventive concept, since denoising and demosaicing is performed on image data in the BayerPlus format in the following image signal processing, the number of bits per pixel decreases as compared to when the RGB format is used, and therefore, computational complexity also decreases. In addition, since the BayerPlus format has denser green color information than the RGB format, image resolution may be improved.

Figure 5:
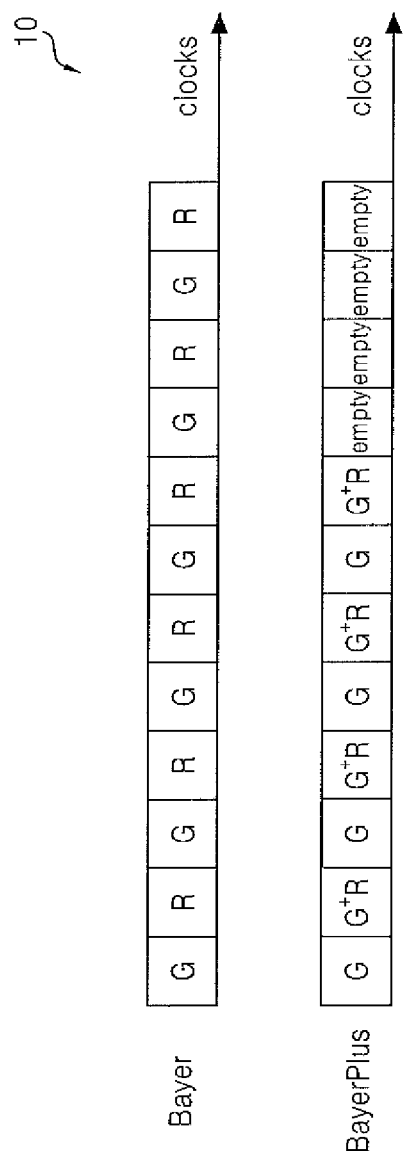
FIG. 5 is a conceptual diagram for explaining the operation of a downscaler block illustrated in FIG. 2.

FIG. 5 is a conceptual diagram for explaining the operation of the downscaler block 10 illustrated in FIG. 2. The downscaler block 10 downscales the resolution of raw data to a target resolution. In other words, the details of a raw data image of the Bayer format may be efficiently stored by using the BayerPlus format.

The size (e.g., number of bits, number of pixels) of blocks of the scaled image data may be increased as compared to the normal Bayer format. For instance, using the BayerPlus format, the size of a line buffer storing color information of a pixel line in an image increases 1.5 times as compared to the Bayer image data and decreases 1.5 times as compared to the RGB image data. The downscaler block 10 may convert the raw image data in the Bayer format into the BayerPlus format by selectively skipping at least one pixel from red color information, green color information and blue color information. For instance, the downscaler block 10 may bin red, green and blue color information into at least one pixel to convert the Bayer image data into the BayerPlus image data. In an exemplary embodiment, binning refers to combining the electrical charges of neighboring pixels to form a superpixel. Binning in color images sensors may include combining the neighboring pixels with the same color filter. In an exemplary embodiment, the downscaler block 10 may generate green pixel value of green plus pixel (i.e., BayerPlus pixel $G^+R$, $G^+B$) by interpolating nearby 4 green pixels or calculating weighted average of a plurality of green pixels using TAB filter. In an exemplary embodiment, the downscaler block 10 may generate green pixel value of green plus pixel by performing color space conversion on nearby R, G and B pixels.

When the raw image data in the Bayer format, which has N bits per pixel, is downscaled to have 1.5N bits per pixel, as shown in FIG. 5, the number of data slots per clock decreases 1/1.5 times due to the downscaling, and therefore, free slots which are empty of data may occur. However, the inventive concept is not limited to the above-described downscaling, as various downscaling methods may be used in embodiments of the inventive concept.

Figure 6:
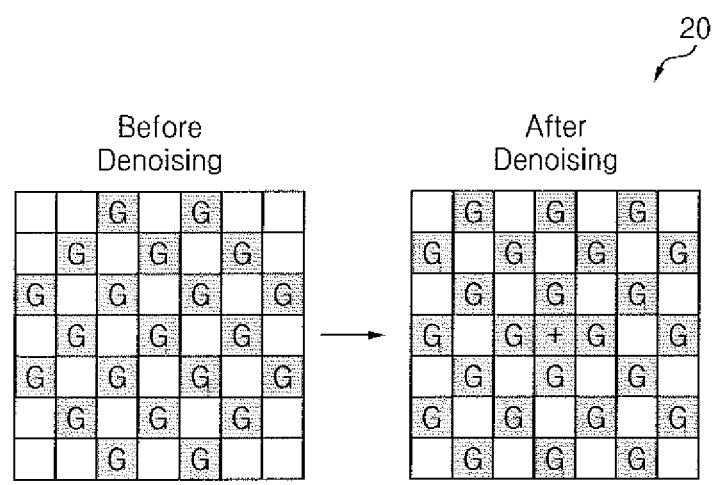
FIG. 6 is a conceptual diagram for explaining the operation of a denoising block illustrated in FIG. 2.

FIG. 6 is a conceptual diagram for explaining the operation of the denoising block 20 illustrated in FIG. 2. Human eyes are more sensitive to green color than to red and blue colors. Since the Bayer image format has twice more green color information than red or blue color information, it may be efficient to remove noise from a green channel. In the green channel of the image data output after downscaling is performed on the Bayer image data, green color information is distributed around the central part of the image data. The disposition of the green color information at the central part of the image data affects mosaicing, which may cause noise like a check-pattern noise.

The denoising block 20 denoises the downscaled image data. In an exemplary embodiment denoising is performed not on the Bayer image data but on the BayerPlus image data, which may reduce computational complexity. For instance, as shown in FIG. 6, only normal green pixels are used, but green plus pixels (i.e., BayerPlus pixels $R^+G$, $B^+G$, and $G^+$) are not used. The operation of the denoising block 20 is not restricted just to the BayerPlus image data but may also be performed on the Bayer image data.

Figure 7:
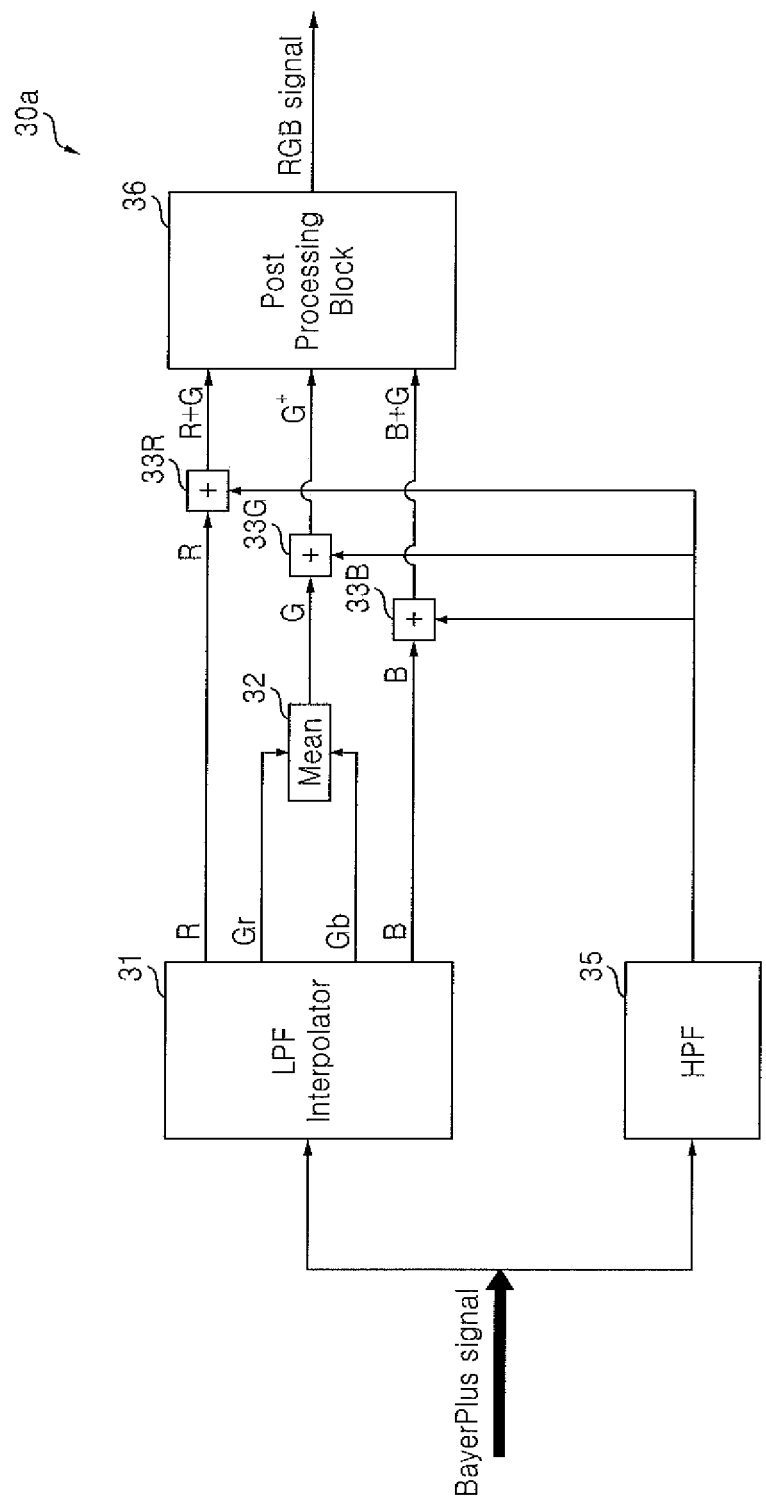
FIG. 7 is a conceptual diagram of a demosaicing block illustrated in FIG. 2 according to an exemplary embodiment of the inventive concept.
Figure 8:
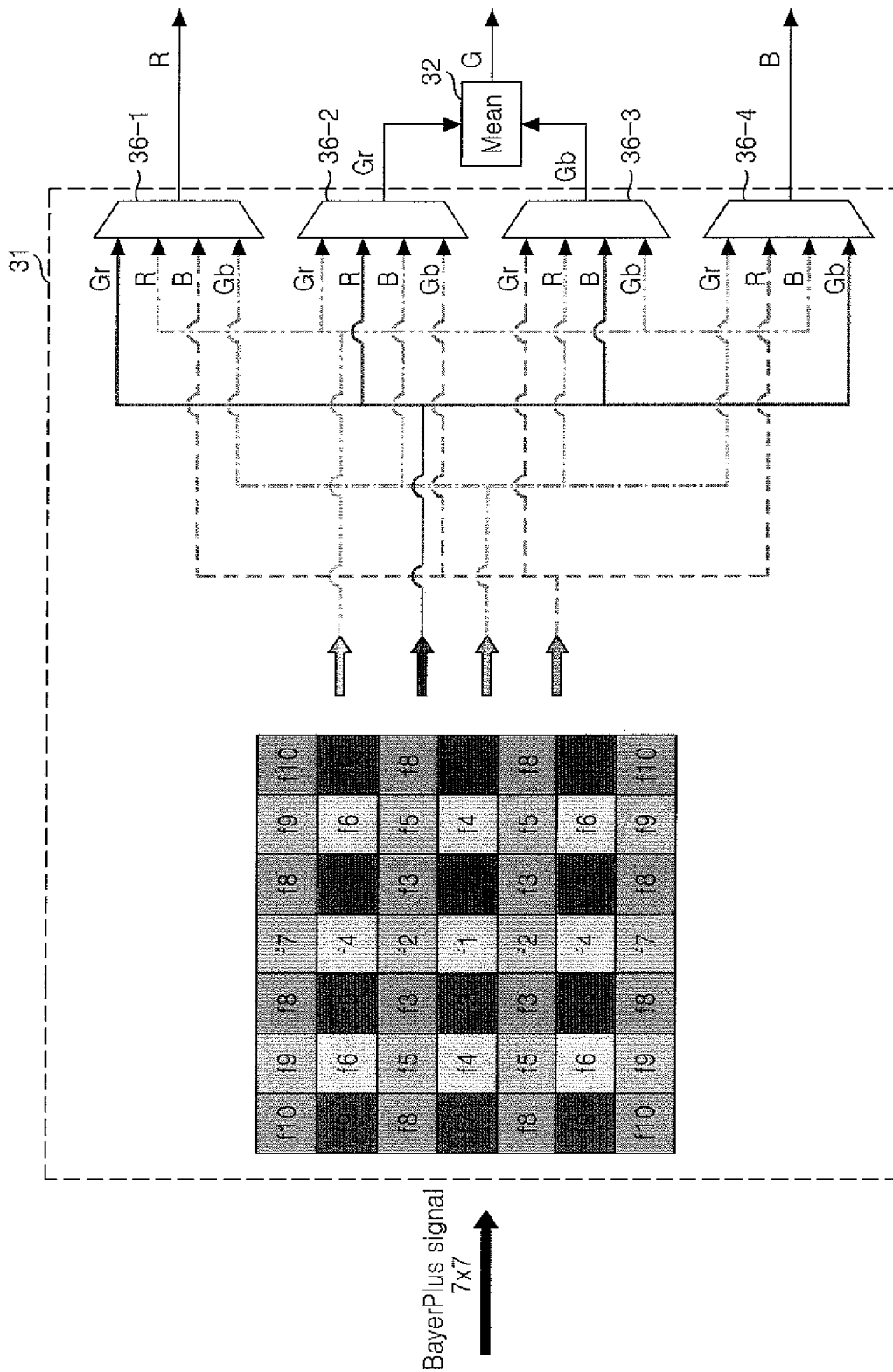
FIG. 8 is a detailed conceptual diagram of a low-pass filter (LPF) interpolator illustrated in FIG. 7 according to an exemplary embodiment of the inventive concept.

FIG. 7 is a conceptual diagram of an example 30a of the demosaicing block 30 illustrated in FIG. 2 according to an exemplary embodiment of the inventive concept. FIG. 8 is a detailed conceptual diagram of a low-pass filter (LPF) interpolator 31 illustrated in FIG. 7 according to an exemplary embodiment of the inventive concept.

Referring to FIGS. 2 and 7, the demosaicing block 30a includes the LPF interpolator 31, a mean block 32, adder blocks 33R, 33B, and 33G, a high-pass filter (HPF) 35, and a post processing block 36. In an exemplary embodiment, differences among R, B and G channels are correlated. In other words, R channel=G channel+C1 and B channel=G channel+C2, where C1 and C2 are constants. The demosaicing block 30a converts the mosaiced Bayer image data, which has only specific color information per each pixel, into the RGB image data having full color in each pixel.

The demosaicing block 30a receives a BayerPlus signal (corresponding to the BayerPlus image data) from the denoising block 20 and separately processes it in the LPF interpolator 31 and the HPF 35. The high-frequency range in the image data indicates the edge region in an image and the low-frequency range in the image data indicates the flat region in the image. When the BayerPlus signal is processed in the LPF interpolator 31, BayerPlus pixels corresponding to the flat region are classified into four channels (e.g., red color information R, first green plus color information Gr, second green plus color information Gb, and blue color information B).

The LPF interpolator 31 multiplies each of the pixels in the denoised BayerPlus signal by an LPF coefficient corresponding to each pixel and then interpolates the BayerPlus signal with the red color information R, the blue color information B, the first green plus color information Gr, and the second green plus color information Gb. The LPF interpolator 31 illustrated in FIG. 8 applies to a case where the BayerPlus signal corresponds to a 7×7 local area. The LPF interpolator 31 multiples each pixel in the local area by a corresponding coefficient (e.g., one of coefficients f1 through f10). For instance, a pixel at the center of the local area is multiplied by the coefficient f1. When the results of multiplications on pixels in each channel are added up, an interpolated value for the channel is obtained. In an exemplary embodiment, the arrangement of the coefficients f1 through f10 corresponding to the local area are symmetric in all directions (e.g., horizontal, vertical and diagonal directions) in the LPF interpolator 31. In an exemplary embodiment, the arrangement of coefficients of one center diagonal is symmetric to the coefficients of the other center diagonal (e.g., f10, f6, f3, f1, f3, f6, and f10), and the coefficients of a center horizontal is symmetric to the coefficients of a center vertical (e.g., f7, f4, f2, f1, f2, f4, f7). Color information is output from the interpolated values obtained for the respective four channels R, B, Gr, and Gb using multiplexers 36-1 through 36-4 corresponding to the respective four channels R, B, Gr, and Gb.

The mean block 32 outputs the mean of the first green plus color information Gr and the second green plus color information Gb as green plus color information G. In an exemplary embodiment, the first green plus color information Gr is a value obtained by partially correlating the red color information R with green color information and the second green plus color information Gb is a value obtained by partially correlating the blue color information B with green color information.

The HPF 35 passes the high-frequency range of the denoised BayerPlus signal. In an exemplary embodiment, the HPF 35 multiplies each of the pixels in the 7×7 local area by an HPF correlation coefficient, adds up all results of multiplications, and outputs edge information. The arrangement of correlation coefficients is symmetric in all directions (e.g., horizontal, vertical and diagonal directions) in the HPF 35 as in the LPF interpolator 31.

The adder blocks 33R, 33G, and 33B correlate an output value of the HPF 35 and the red color information R, the green plus color information G, and the blue color information B, respectively, thereby outputting output red channel information R+G, output green channel information G$^+$, and outputting output blue channel information B+G to the post processing block 36. The post processing block 36 may use Freeman's median filtering, anti-aliasing, or the like to output image data in the RGB format.

While the demosaicing block 30a is illustrated in FIG. 7 processing image data in the BayerPlus format, the inventive concept is not limited thereto as the demosaicing block 30 may process image data in the Bayer format in other embodiments.

Figure 9:
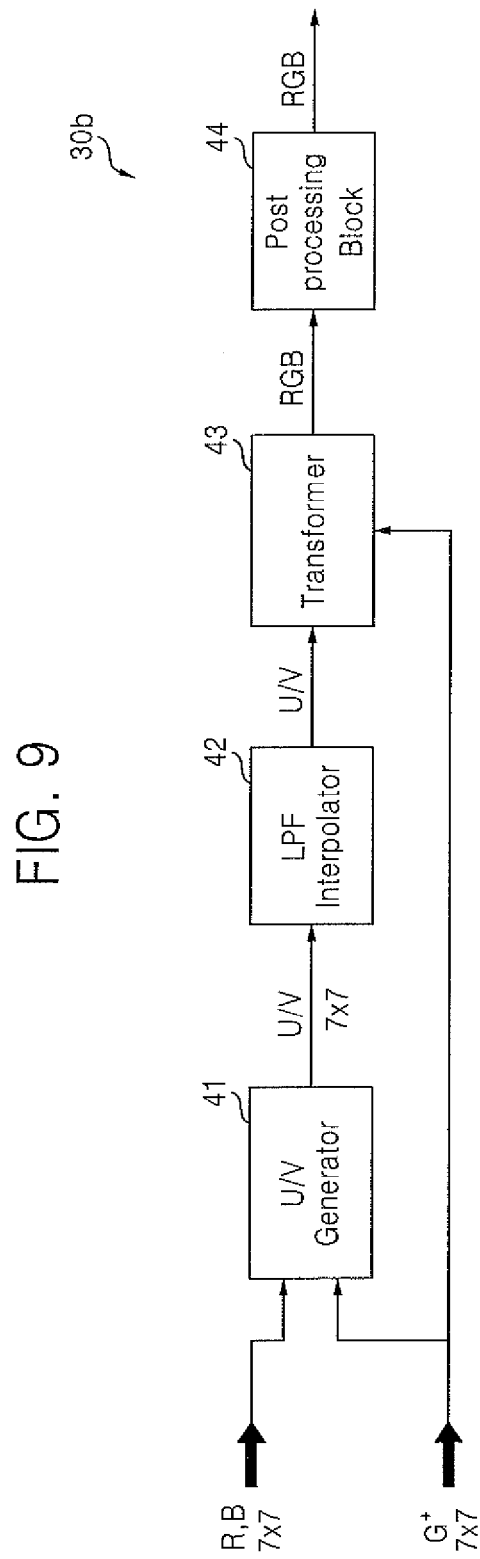
FIG. 9 is a conceptual diagram of a demosaicing block illustrated in FIG. 2 according to an exemplary embodiment of the inventive concept.
Figure 10:
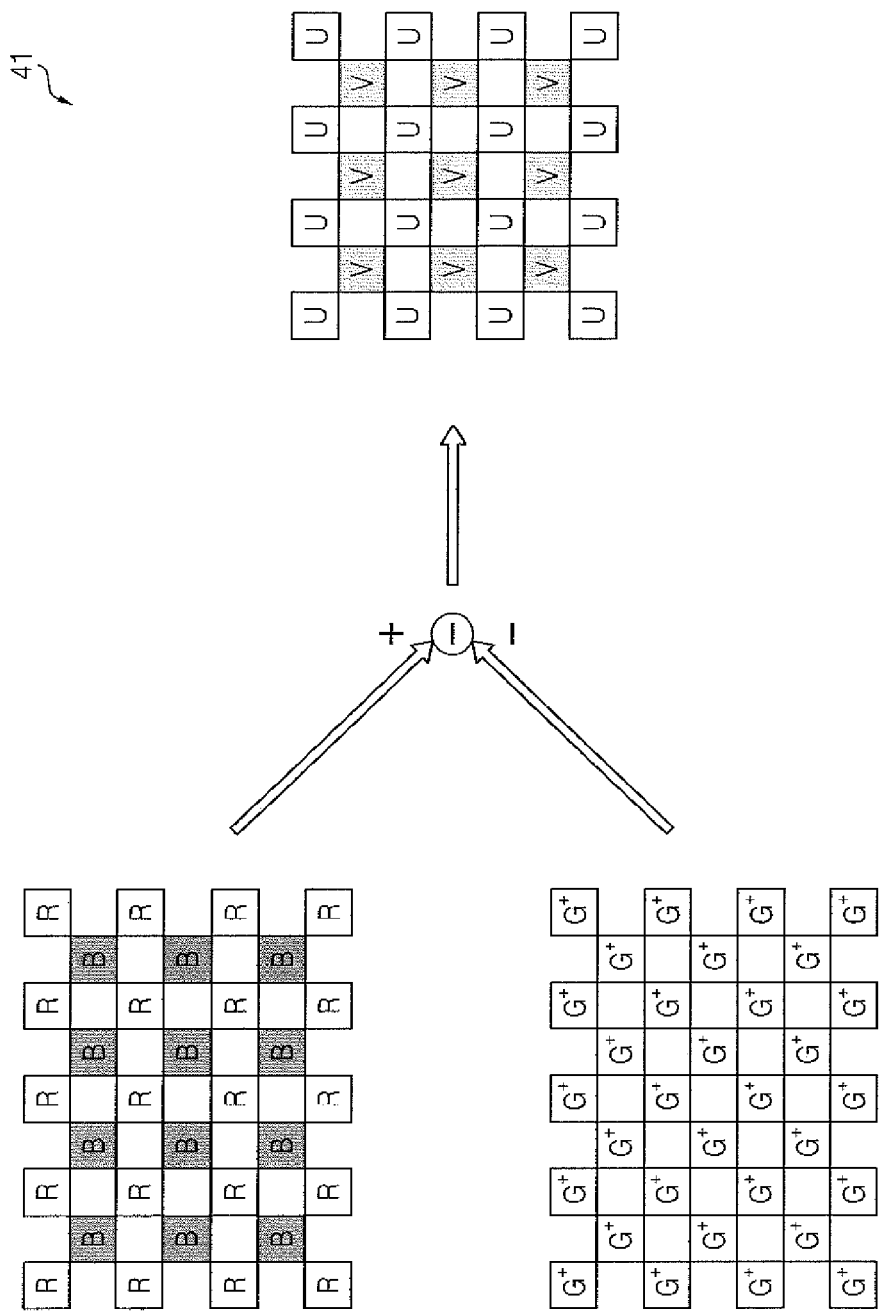
FIG. 10 is a conceptual diagram of the operation of the demosaicing block illustrated in FIG. 9.

FIG. 9 is a conceptual diagram of an example 30b of the demosaicing block 30 illustrated in FIG. 2 according to an exemplary embodiment of the inventive concept. FIG. 10 is a conceptual diagram of the operation of the demosaicing block 30b illustrated in FIG. 9. The demosaicing block 30b includes a U/V generator 41, an LPF interpolator 42, a transformer 43, and a post processing block 44.

The U/V generator 41 converts the denoised BayerPlus image signal (RG$^+$B), which includes red, blue and green color information in the local area, into an image signal in a YUV format (e.g., YUV pixel data). For the conversion, coefficients may be adaptively applied to RG$^+$B pixel values according to a target resolution and YUV pixel values may be obtained like Y=0.299R+0.587G+0.114B, U=(B−Y)*0.5643, and V=(R−Y)*0.7132. However, the inventive concept is not limited to use of any particular multiplier constants for the YUV format. For example, while above constants such as 0.299, 0.587, 0.114, 0.5643, and 0.7132 are used, these constants may have different values in other embodiments. In an exemplary embodiment, the LPF interpolator 42 passes and interpolates YUV image information only in a low-frequency range and not in a high-frequency range. The transformer 43 combines an output value of the LPF interpolator 42 with the green plus color information G$^+$, which includes the image information in the high-frequency range and lost color information, into the RGB format. In an exemplary embodiment, the LPF interpolator 42 has a structure similar to that shown in FIG. 8, thus to receive integer values as inputs and output an R channel including a U pixel value and a B channel including V pixel value using multiplexers. The post processing block 44 may use Freeman's median filtering, anti-aliasing, or the like to output image data in the RGB format.

The demosaicing block 30b is not restricted to processing image data in the BayerPlus format, but may process image data in the Bayer format in other embodiments.

Figure 11:
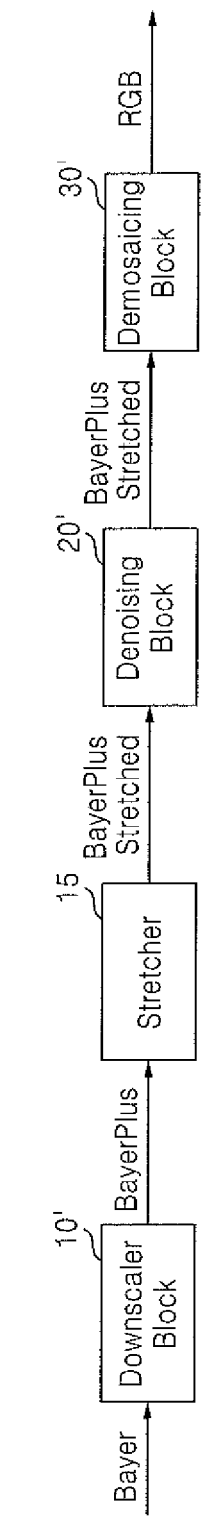
FIG. 11 is a block diagram of the ISP illustrated in FIG. 1 according to an exemplary embodiment of the inventive concept.
Figure 12:
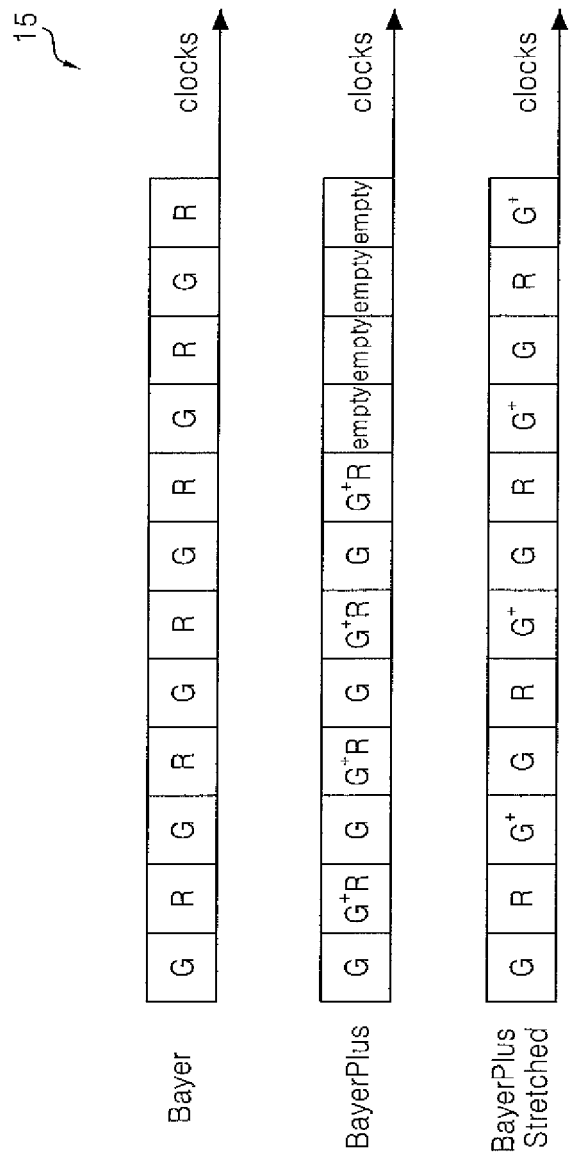
FIG. 12 is a timing chart showing the operation of a stretcher illustrated in FIG. 11.

FIG. 11 is a block diagram of the ISP 100 illustrated in FIG. 1 according to an exemplary embodiment of the inventive concept. FIG. 12 is a timing chart showing the operation of a stretcher 15 illustrated in FIG. 11. For sake of convenience, differences from the embodiments illustrated in FIG. 2 will be mainly described.

Referring to FIG. 11, the ISP 100 includes a downscaler block 10', the stretcher 15, a denoising block 20', and a demosaicing block 30'. When the raw image data in the Bayer format, which has N bits per pixel, is downscaled by the downscaler block 10' to have 1.5N bits per pixel, the number of data slots per clock decreases 1/1.5 times due to the downscaling, and therefore, free slots which are empty of data may occur.

The stretcher 15 stretches the BayerPlus image data. As shown in FIG. 12, when the BayerPlus image data is input to the downscaler block 10', a pattern of G and R is six times repeatedly input to the downscaler block 10' according to clocks. The BayerPlus image data having a resolution in which a pattern of G and G$^+$R is repeated four times is input to the stretcher 15 according to clocks. Since four clocks are empty of input data, the stretcher 15 stretches the BayerPlus image data and inputs BayerPlus stretched image data to the denoising block 20'. In other words, the BayerPlus stretched image data has a resolution in which a pattern of G, R, and G$^+$ is repeated four times and is linearly denoised and demosaiced without free slots. For example, each time a G is encountered in the BayerPlus image data, a G is inserted into the BayerPlus stretched image data, and each time a G$^+$R is encountered in the BayerPlus image data, an R followed by a G$^+$ is inserted into the BayerPlus stretched image data.

Figure 13:
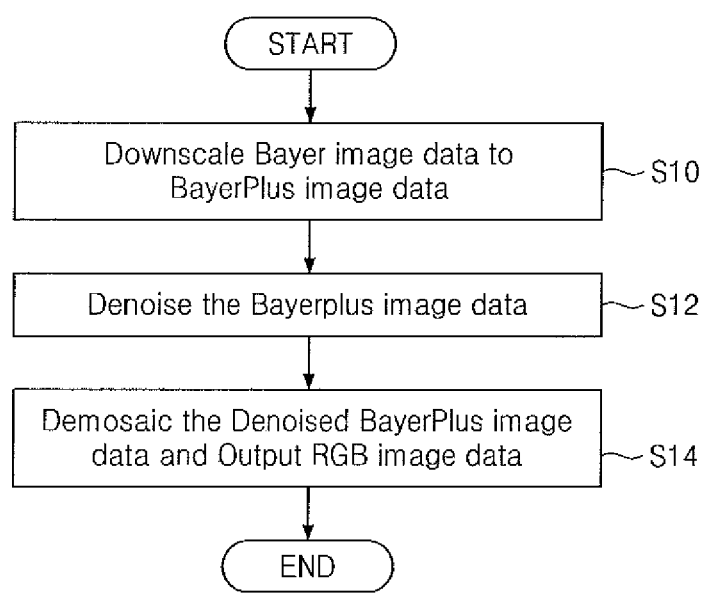
FIG. 13 is a flowchart of an image processing method according to an exemplary embodiment of the inventive concept.

FIG. 13 is a flowchart of an image processing method according to an exemplary embodiment of the inventive concept. The method includes the ISP 100 downscaling the Bayer image data received from the image sensor 200 to a target resolution and converting it into BayerPlus image data in (S10). The method further includes the ISP 100 denoising the BayerPlus image data (S20). The method further includes the ISP 100 demosaicing the denoised BayerPlus image data and outputting RGB image data having the target resolution (S30). Instead of RGB image data, BayerPlus image data having fewer bits per pixel is used in the denoising and demosaicing processes, which may reduce computational complexity, reduce power consumption, and increase image quality.

The methods described above may be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be developed by computer programmers.

Figure 14:
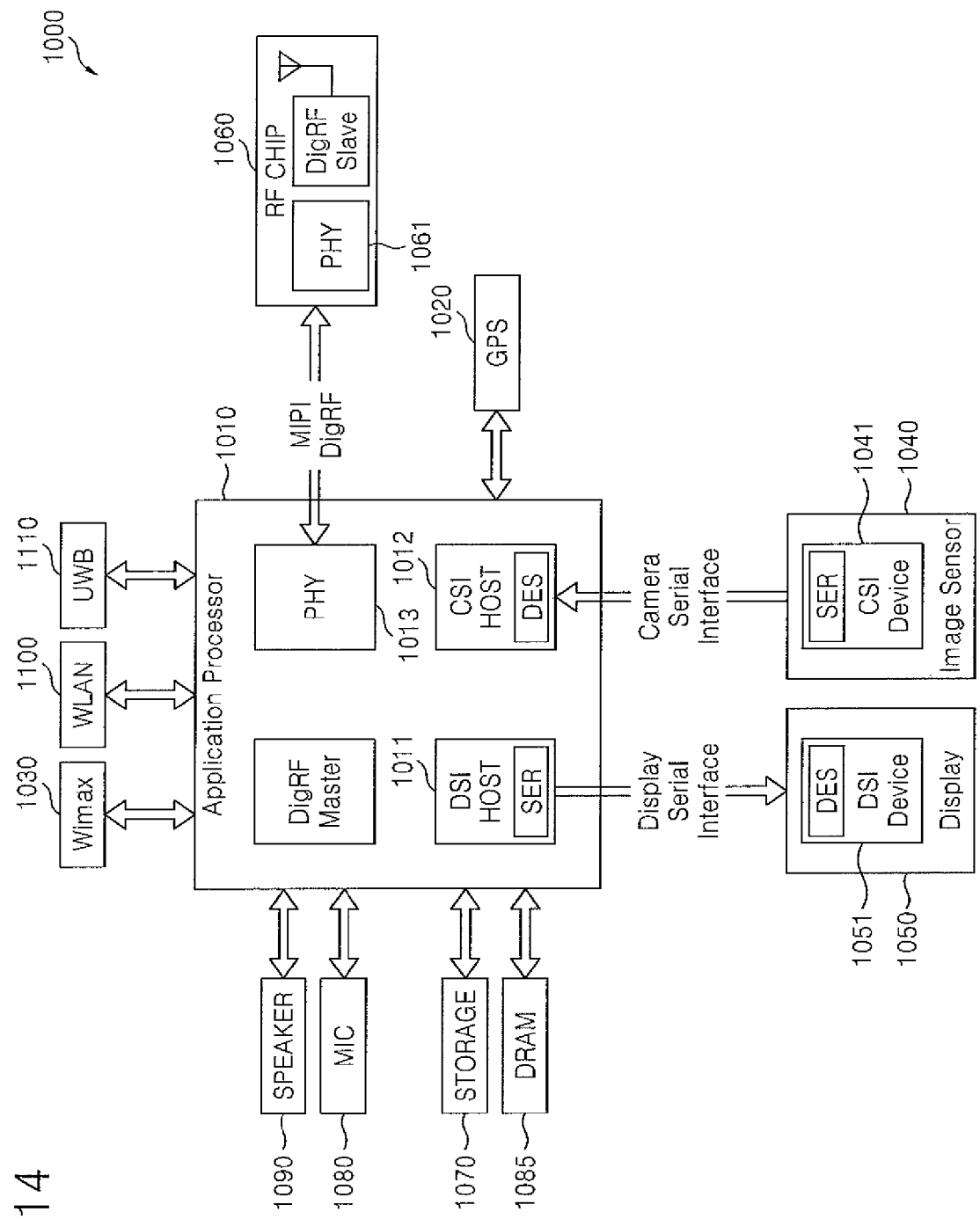
FIG. 14 is a block diagram of an image processing system including an image sensor according to an exemplary embodiment of the inventive concept.

FIG. 14 is a block diagram of an image processing system including an image sensor according to an exemplary embodiment of the inventive concept. The image processing system 1000 may be implemented by a data processing apparatus, such as a personal digital assistant (PDA), a portable media player (PMP), a mobile phone, or a smart phone that can use or support the MIPI (mobile industry processor interface) standard. The image processing system 1000 includes an application processor 1010, an image sensor 1040, and a display 1050.

A camera serial interface (CSI) host 1012 included in the application processor 1010 performs serial communication with a CSI device 1041 included in the image sensor 1040 through CSI. For example, an optical de-serializer (DES) may be implemented in the CSI host 1012, and an optical serializer (SER) may be implemented in the CSI device 1041.

A DSI host 1011 included in the application processor 1010 performs serial communication with a DSI device 1051 included in the display 1050 through DSI. For example, an optical serializer (SER) may be implemented in the DSI host 1011, and an optical de-serializer (DES) may be implemented in the DSI device 1051.

The image processing system 1000 may also include a radio frequency (RF) chip 1060 which communicates with the application processor 1010. A physical layer (PHY) 1013 of the image processing system 1000 and a PHY of the RF chip 1060 communicate data with each other according to a MIPI DigRF standard. The image processing system 1000 may further include at least one element among a GPS 1020, a storage device 1070, a microphone 1080, a DRAM 1085 and a speaker 1090. The image processing system 1000 may communicate using Wimax (Worldwide Interoperability for Microwave Access) 1030, WLAN (wireless local area network) 1100 or UWB (Ultra-wideband) 1110, etc.

As described above, according to at least one exemplary embodiment of the inventive concept, a new image format which increases the number of bits per pixel and the density of a green channel is used in the image processing of an ISP, which may decrease computational complexity. As a result, image quality may be increased at a lower cost and power consumption may be reduced in an image processing system.

While the inventive concept has been particularly shown and described with reference to exemplary embodiments thereof, it will be understood that various changes in forms and details may be made therein without departing from the spirit and scope of the inventive concept.

What is claimed is:

1. An image processing method comprising:
    receiving image data of a Bayer format comprising red color information for a first pixel, green color information for a second pixel, and blue color information for a third pixel, wherein the second pixel is adjacent to the first and third pixels;
    generating image data of a modified Bayer format comprising green-red color information for the first pixel by combining the green color information with the red color information, the green color information of the second pixel, and green-blue color information for the third pixel by combining the green color information with the blue color information, while downscaling the image data of the Bayer format to a target resolution;
    denoising the image data of the modified Bayer format; and
    generating RGB image data by demosaicing the denoised image data of the modified Bayer format.

2. The image processing method of claim 1, wherein the generating the image data of the modified Bayer format comprises selectively skipping at least one pixel from the red color information, the green color information, and the blue color information to convert the image data of the Bayer format into the image data of the modified Bayer format.

3. The image processing method of claim 1, wherein the generating the image data of the modified Bayer format comprises binning the red color information, the green color information, and the blue color information into at least one pixel to convert the image data of the Bayer format into the image data of the modified Bayer format.

4. A non-transitory computer readable recording medium for storing a code for executing the image processing method of claim 1.

5. The image processing method of claim 1, wherein the generating of the image data comprises adding the green color information to the red color information to generate the green-red color information, and adding the green color information to the blue color information to generate the green-blue color information.

6. An apparatus for processing image data comprising:
    an image signal processor receiving image data of a Bayer format comprising red color information of a first pixel, green color information of a second pixel, and blue color information of a third pixel, converting the image data of the Bayer format into image data of a modified Bayer format comprising green-red color information for the first pixel by combining the green color information with the red color information, the green information of the second pixel, and green-blue color information for a third pixel by combining the green color information with the blue color information while, downscaling the image data of the Bayer format to a target resolution; denoising the image data of the modified Bayer format; and converting the denoised image data of the modified Bayer format into RGB image data, wherein the second pixel is adjacent to the first and third pixels.

7. The apparatus of claim 6, wherein the image signal processor selectively skips at least one pixel from the image data of the Bayer format to convert the image data of the Bayer format into the image data of the modified Bayer format.

8. The apparatus of claim 6, wherein the image signal processor bins the image data of the Bayer format into at least one pixel to convert the image data of the Bayer format into the image data of the modified Bayer format.

9. The apparatus of claim 6, wherein the image signal processor comprises:
    a U/V generator configured to convert the denoised image data of the modified Bayer format into a U/V image signal comprising YUV pixel data having the target resolution based on the red color information, the blue color information, and the green color information in a predetermined local area;
    a low-pass filter (LPF) interpolator configured to pass and interpolate information only in a low-frequency range of the U/V image signal; and
    a transformer configured to combine an output value of the LPF interpolator and the green color information into RGB format data,
    wherein the image signal processor is configured to post process the RGB format data to generate the RGB image data.

10. The apparatus of claim 6, wherein the combining the green color information with the red color information comprises adding the green color information to the red color information to generate the green-red color information and the combining the green color information with the blue color information comprises adding the green color information to the blue color information to generate the green-blue color information.

11. An image processing system comprising:
    an image sensor; and
    the apparatus of claim 6.

12. The apparatus of claim 6, wherein the image signal processor comprises:
    a low-pass filter (LPF) interpolator configured to multiply each of pixels in the denoised image data of the modified Bayer format by an LPF coefficient corresponding to each pixel and then interpolate the multiplied image data with the red color information, the blue color information, first green plus color information comprising the green color information added to the red color information, and second green plus color information comprising the green color information added to the blue color information; and
    a high-pass filter (HPF), wherein the image signal processor is configured to output a mean of the first green plus color information and the second green plus color information as green plus color information, wherein the HPF is configured to pass a high-frequency range of the denoised image data of the modified Bayer format, wherein the image signal processor is configured to correlate an output value of the HPF and each of the red color information, the green plus color information, and the blue color information and to output red channel information, output green channel information, and output blue channel information, wherein the image signal processor is configured to post process the output red channel information, the output green channel information, and the output blue channel information and to output the RGB image data.

13. The apparatus of claim 12, wherein the LPF coefficients are arranged to be symmetric in all directions comprising a horizontal direction, a vertical direction, and a diagonal direction.

14. The apparatus of claim 6, further comprising a stretcher configured to linearly stretch the image data of the modified Bayer format into stretched image data.

15. The apparatus of claim 14, wherein the image signal processor denoises the stretched image data into the denoised image data and converts the denoised image data into the RGB image data.

* * * * *